United States Patent [19]

Jorgensen et al.

[11] 4,420,929

[45] Dec. 20, 1983

[54] DUAL STAGE-DUAL MODE LOW EMISSION GAS TURBINE COMBUSTION SYSTEM

[75] Inventors: Robert A. Jorgensen, Clifton Park; Roger A. Farrell, Schenectady; Bruce W. Gerhold, Rexford, all of N.Y.

[73] Assignee: General Electric Company, Schenectady, N.Y.

[21] Appl. No.: 194,285

[22] Filed: Oct. 6, 1980

Related U.S. Application Data

[62] Division of Ser. No. 3,016, Jan. 12, 1979, abandoned.

[51] Int. Cl.³ .......................... F23R 3/30; F23R 3/34
[52] U.S. Cl. .................................... 60/39.06; 60/733; 60/737; 60/746
[58] Field of Search .................. 60/39.06, 737, 746, 60/738, 732, 733

[56] References Cited

U.S. PATENT DOCUMENTS

| | | | |
|---|---|---|---|
| 2,999,359 | 9/1961 | Murray | 60/746 |
| 3,001,366 | 9/1961 | Shutts. | |
| 3,048,014 | 8/1962 | Schmidt | 60/746 |
| 3,872,664 | 3/1975 | Lohmann et al. | 60/737 |
| 3,925,002 | 12/1975 | Verdouw | 60/746 |
| 3,946,553 | 3/1976 | Roberts et al. | 60/737 |
| 3,958,413 | 5/1976 | Cornelius et al. | 60/737 |
| 3,958,416 | 5/1976 | Hammond et al. | 60/737 |
| 3,973,395 | 8/1976 | Markowski et al. | 60/746 |
| 4,045,956 | 9/1977 | Markowski et al. | 60/746 |
| 4,052,844 | 10/1977 | Caruel et al. | 60/746 |
| 4,112,676 | 9/1978 | De Corso | 60/737 |
| 4,173,118 | 11/1979 | Kawaguchi | 60/733 |
| 4,192,139 | 3/1980 | Buchheim | 60/739 |
| 4,193,260 | 3/1980 | Carlisle et al. | 60/737 |
| 4,253,301 | 3/1981 | Vogt | 60/746 |
| 4,292,801 | 10/1981 | Wilkes et al. | 60/733 |

FOREIGN PATENT DOCUMENTS

| | | |
|---|---|---|
| 2613589 | of 0000 | Fed. Rep. of Germany. |
| 2040031 | 8/1980 | United Kingdom ................. 60/733 |

OTHER PUBLICATIONS

Carlstrom, L. A., et al., "Improved Emissions Performance in Today's Combustion System", International Seminar, Jun. 1978.

Primary Examiner—Robert E. Garrett
Attorney, Agent, or Firm—J. C. Squillaro

[57] ABSTRACT

A gas turbine combustor arrangement involves two combustion chambers separated by a necked down throat portion with provision for fuel introduction into each of the chambers. Initially, fuel is introduced into the first chamber and ignited. Thereafter, fuel is introduced into the second chamber until the total fuel flow to the combustor is at the desired rate. Burning in the first chamber is then extinguished by shifting fuel flow to the second chamber and after burning termination, the fuel distribution is reversed until a low emission operation is realized. Apparatus for carrying out the foregoing method and a high load ignition system is also disclosed.

6 Claims, 4 Drawing Figures

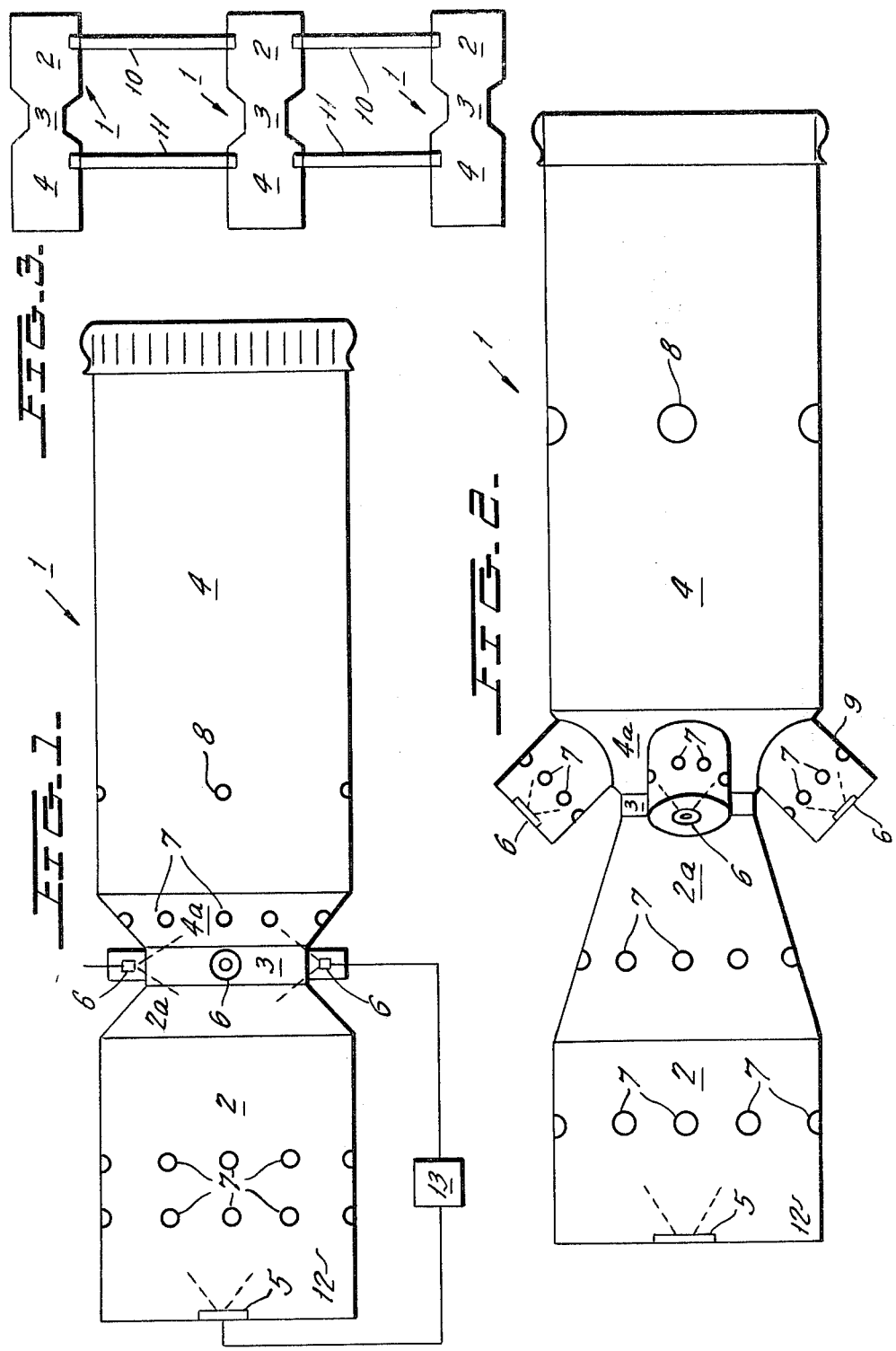

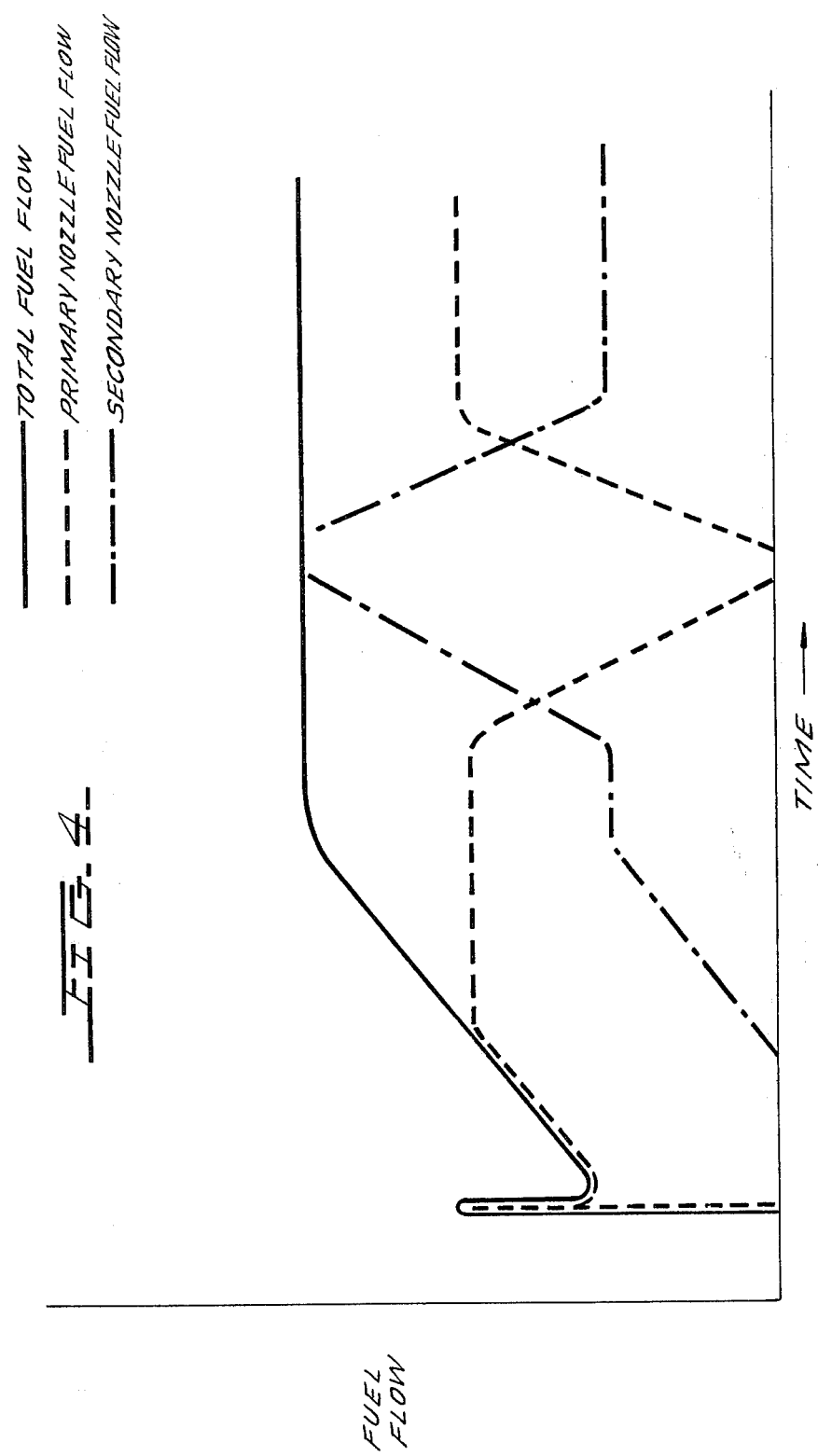

4,420,929

DUAL STAGE-DUAL MODE LOW EMISSION GAS TURBINE COMBUSTION SYSTEM

This is a division, of application Ser. No. 003,016, filed Jan. 12, 1979 now abandoned.

BACKGROUND OF THE INVENTION

In recent years, gas turbine manufacturers have become increasingly concerned with pollutant emissions. Of particular concern has been the emissions of nitrogen oxides ($NO_x$) because such oxides are a precurser to air pollution.

It is known that $NO_x$ formation increases with increasing flame temperature and with increasing residence time. It is therefore theoretically possible to reduce $NO_x$ emissions by reducing the flame temperature and/or the time at which the reacting gases remain at the peak temperatures. In practice, however, this is difficult to achieve because of the turbulent diffusion flame characteristics of present day gas turbine combustors. In such combustors, the combustion takes place in a thin layer surrounding the evaporating liquid fuel droplets at a fuel/air equivalency ratio near unity regardless of the overall reaction zone equivalence ratio. Since this is the condition which results in the highest flame temperature, relatively large amounts of $NO_x$ are produced. As a result, the conventional single-stage single-fuel nozzle spray atomized combustors may not meet newly established emission standards no matter how lean the nominal reaction zone equivalence ratio.

It is known that the injection of significant amounts of water or steam can reduce $NO_x$ production so that the conventional combustors can meet the low $NO_x$ emission requirements. However, such injection also has many disadvantages including an increase in system complexity, an increase in operating costs due to the necessity for water treatment, and the degrading of other performance parameters.

Attempts to achieve a homogeneous lean reaction zone by externally prevaporizing and premixing fuel and air at lean equivalence ratios have only limited applicability. These designs have typically been used for clean, very volitale fuels such as gasoline, jet fuel, etc., for regenerative cycle (elevated combustor inlet temperature), and at reduced pressures (less than 10 atmospheres). Beyond the increase in complexity, a serious drawback to this appraoch is the danger of autoignition and flashback. At 10 atmospheres pressure, the residence time required for complete vaporization of distillate fuel and that for autoignition is nearly the same. See, e.g., ASME Preprint 77-GT-69.

The problem of realizing low $NO_x$ emissions develops further complexity when it is necessary to meet other combustion design criteria. Among such criteria are those of good ignition qualities, good crossfiring capability, stability over the entire load range, large turndown ratio, low traverse number, long life and the ability to operate safely.

Some of the factors which result in the formation of nitrogen oxides from fuel nitrogen and air nitrogen are known and efforts have been made to adapt various combustor operations in light of these factors. See, for example, U.S. Pat. Nos. 3,958,416, 3,958,413 and 3,946,553. The processes used heretofore, however, have either been not adaptable for use in a combustor for a stationary gas turbine or have been inadequate for the reasons set forth below.

It is the object of this invention to provide a new dual stage-dual mode combustion system for a gas turbine which will operate over the entire gas turbine cycle at flame temperatures which will substantially reduce pollutant emissions to acceptable levels using various gaseous and distillate fuel.

This and other objects of the invention will become apparent to those skilled in this art from the following detailed description in which:

FIG. 1 is a schematic cross-section of a first embodiment of the present invention;

FIG. 2 is a schematic cross-secton of a second embodiment of the present invention;

FIG. 3 is a schematic representation of three combustors of the present invention having a high load ignition system; and FIG. 4 is a graph illustrating the fuel flow in the operation of the present combustors as a function of time.

SUMMARY OF THE INVENTION

This invention relates to a combustor for a stationary gas turbine. For example, an arangement of combustors and the method by which they are operated in order to realize a reduction in $NO_x$ emissions. More particularly, the combustor has two combustion chambers connected through a neck portion, separate fuel introduction means for each section and means to regulate the flow of fuel of each fuel injection means relative to the others. In case blowout should occur, the combustors are provided with a high load ignition system by connecting each first section of adjacent combustors and each second section of adjacent combustors by crossfire tubes. The combustor is operated by first introducing fuel only into the first section and causing it to burn therein. Thereafter the flow of fuel is shifted into the second section until burning in the first section terminates followed by a reshifting of the fuel distribution into the first section for mixing purposes until the desired $NO_x$ reduction has been achieved.

DESCRIPTION OF THE INVENTION

Referring to FIGS. 1 and 2, the combustor 1 of the present invention generally comprises a first combustion zone or section 2 which is connected to a neck or throat section or zone 3 which, in turn, is connected to a second combustion zone or section 4.

First combustion zone 2 can be of a conventional lean combustor design utilizing a single, preferably axisymmetric fuel nozzle 5. The second combustion zone 4 is supplied with fuel from a plurality of fuel nozzles 6. In FIGS. 1 and 2, four radial nozzles located symmetrically on the combustor circumference are shown but any number of nozzles can be used as desired. Air from the gas turbine compressor (not shown) is introduced into the combustor at elevated pressure, typically from about 10-30 atmospheres. For example, the air can be introduced through one or more air entry ports 7. Ports 7 located in first combustion zone 2 are preferably positioned so as to cause a flow recirculation which results in a stable burning over a wide operating range. Provisions is made for the rapid cooling of the combustion products in zone 4 with a suitable heat exchange fluid. For example, quenching air can be admitted to zone 4 through a plurality of apertures 8. The amount of heat exchange fluid employed is that sufficient to cool the combustion products so as to reduce the fluid temperature to the desired gas turbine firing temperature.

Zones 2, 3 and 4 are preferably of circular cross-section but any desired configuration can be employed. The material of construction can be metal or ceramic and the zones can be surface cooled by a variety of techniques including water-cooling, closed system cooling, steam film cooling and conventional air film cooling. By way of example only, a useful arrangement of annular rows of schematically spaced louvers along the zone walls to provide air film cooling is described in Dibelius and Schiefer U.S. Pat. No. 3,777,484, and a useful arrangement of slot cooling is described in Corrigan and Plemmons U.S. Pat. No. 3,728,039.

It will be appreciated that neck of throat 3 acts as an aerodynamic separator or isolator between the first combustion zone 2 and the second combustion zone 4. In order to adequately serve this function, neck 3 must have an adequately reduced diameter relative to first zone 2 and second zone 4. In general, a ratio of the smaller of the first combustion zone 2 or second combustion zone 4 diameter to neck zone 3 diameter of at least 1.2:1, and preferably at least about 1.5:1, is employed. To facilitate a smooth transition between first combustion zone 2 and neck 3, the downstream most portion 2a of zone 2 is of uniformly decreasing diameter, i.e., has a conical cross-section. The longitudinal length of neck 3 is not critical and any distance which will accomplish the separation function and throttling function of neck 3 can be employed. In general, the longitudinal length of the first combustion zone 2 is at least about three times that of neck 3, and preferably at least about five times that of neck 3. Second combustion zone 4 has the same general configuration as first zone 2 except, of course, that the transitional cone-shaped portion is in the upstream most portion 4a of zone 4 meeting neck 3.

A second and preferred embodiment of the present invention is shown in FIG. 2 in which the same reference numerals have been used to designate like parts in FIG. 1. The arrangement shown in FIG. 2 differs from that shown in FIG. 1 in the following respects. First, the diameter of throat 3 has been reduced in order to increase the average air velocity through the zone, which design is more effective in preventing flashback. The height (i.e. longitudinal length) of convergent conical section 2a has also been increased. In this embodiment, fuel nozzles 6 have been moved from throat 3 to the divergent conical section 4a of second zone 4 and have been set back in mini combustion chambers or swirler cups 9 where the operation of secondary fuel nozzles 6 is more stable and it is less likely to experience blowout during the fuel switching procedures described below.

FIG. 3 shows by way of example three joined combustors of the present invention. The first combustion zone 2 of each combustor 1 is interconnected with the first combustion zone 2 of the adjacent combustors 1 by means of a crossfire tube 10 in the conventional manner. Additionally in the present invention, second combustion zone 4 of each combustor 1 is interconnected to the second combustion zone 4 of each adjacent combustor 1 through a crossfire tube 11. As will be described below, at the design high load conditions of operation of the present combustors, burning is effected only in second zone 4 and no burning occurs in first zone 2. If for some reason one chamber blows out under such high load conditions, crossfiring cannot occur in conventional arrangements since the standard crossfiring tubes 10 are located upstream of the reaction zone 4 and neck 3 serves to prevent flashback. In the embodiment shown in FIG. 3, the second set of crossfire tubes 11 act as a high load ignition system. Although it is preferred to provide the dual set of crossfire tubes (i.e., tubes 10 and 11), any high load relight system can be incorporated into the combustor system if desired.

The operation of the combustors of the present invention is shown graphically in FIG. 4. Combustion begins by igniting a mixture of a hydrocarbon fuel and air in first combustion zone 2. This is accomplished in a conventional manner by means of a spark plug 12 which is located near fuel nozzle 5 in first combustion zone 2. In typical conventional installations, ten combustors are arranged in a ring and usually only two of the combustors are provided with spark plugs 12 while the remaining eight combustors are ignited by crossfiring through crossfire tubes 10. During ignition and crossfiring, and also during low load operation of the combustor, only the primary fuel nozzle 5 delivers fuel to combustor 1. Up to this point, combustion is a single-stage heterogeneous, turbulent diffusion flame burning characteristic of conventional combustors.

At some mid-range load condition, the exact timing of which is related to stability limits and the pollutant emission characteristic of each mode and the fuel split between stages, the secondary fuel nozzles 6 are activated. Passage of the ignited fuel from first zone 2 into second zone 4 causes ignition in second zone 4. The combustor is now operating in a two-stage heterogeneous mode which continues until the desired base load is achieved. After allowing a short period for stabilization and warm-up, the operation is converted from a two-stage heterogeneous combustion to a single-stage homogeneous combustion. This procedure begins by simultaneously increasing the amount of fuel to the secondary nozzles 6 and decreasing the amount to the primary nozzle 5 while the total fuel flow remains constant. The relative rates of fuel flow to nozzles 5 and 6 can be controlled by a fuel flow controller 13 which is interconnected to nozzle 5 and nozzles 6. The change in fuel distribution continues until the flame goes out in the first combustion zone 2 which, in most instances, is when all of the fuel flow has been transferred to secondary nozzles 6.

Fuel flow to nozzle 5 is then reinitiated or increased and flow to nozzles 6 decreased while maintaining the total fuel flow substantially constant. Combustor 1 is designed not to flashback under normal operation by making first zone 2 long enough so that the flow cross-section is similar to that of a fully developed turbulent pipe flow and the throat 3 narrow enough so that the velocity is increased to a level above which the flame speed cannot be overcome. As a result, the majority of the fuel and air premix in the first stage (i.e. first zone 2) and combust homogeneously in the second stage, i.e. second zone 4. The switch of fuel distribution from secondary nozzles 6 to primary nozzle 5 continues until the desired low pollutant emission levels are met. The desired levels are achieved when the majority of fuel flow is through nozzle 5 and in most instances, at least 60% of such flow is through nozzle 5.

It should be appreciated that an important feature of the combustor of the present invention is that if flashback should occur, it is not a hardward catastrophe as in typical premixed designs. However, a significant $NO_x$ penalty would result and control steps must be taken to go through the switching procedure again and resume operation in the homogeneous mode.

During shutdown of the gas turbine, steps are taken to relight first zone 2 because there is only a small turndown ratio in the homogeneous mode. Relighting the first stage means that there is a return to the heterogeneous two-stage combustion where the system has a wide turndown ratio allowing the turbine to be brought down slowly to alleviate undesirable thermal stresses.

In order to demonstrate the reduction in $NO_x$ emissions achieved by the present invention, a combustor constructed in accordance with the present invention was compared to a conventional commercially available combustor using MS 7001E equipment. The combustor of this invention had the configuration shown in FIG. 1 and utilized a single air atomized MS 7001E nozzle as the primary nozzle 5 and four smaller pressure atomized secondary nozzles 6. Data was collected at about 2080° F., laboratory equivalent to base load, (corrected for radiation losses from thermocouples). Under these conditions, the standard conventional combustor exhibited an $NO_x$ emission in the laboratory of 120 ppmv while a combustor constructed in accordance with the present invention emitted only 56 ppmv. This test was run using a vitiated air supply, which means that the products of combustion from a direct heater (such as a propane heater), used to increase air temperature to proper inlet levels, is utilized as the oxidant for combustion during the tests. Therefore, the $NO_x$ emissions are lower than would be obtained with non-vitiated air. Based on these laboratory results it is expected that operation of the combustor of the present invention under field conditions (i.e., actual turbine use with non-vitiated air) with homogeneous operation would exhibit a comparable reduction in $NO_x$ emissions. Therefore, it is estimated that combustors constructed in accordance with the present invention will meet low $NO_x$ emission requirements.

A second test of the dual stage/dual mode combustion system of the present invention was conducted during which a vitiated air supply was utilized and during which the firing temperature remained constant at approximately 2070° F. At a point during the increase of fuel flow in the secondary fuel nozzles 6 when the amount of fuel flow through primary nozzle 5 was 20% and there was combustion in both combustion zone 2 and combustion zone 4, the $NO_x$ emission was about 95 ppmv. After switching from the two-stage heterogeneous combustion mode to the homogeneous combustion mode, at a point where approximately 14 percent of the fuel was flowing through the primary nozzle (of the first stage), the $NO_x$ emissions were 93.5 ppmv. The amount of fuel flowing to the primary nozzle 5 was then increased from 14% to a point at which approximately 70% of the total fuel flow was through the primary nozzle and the $NO_x$ emission continued to decrease from 93.5 ppmv to about 49 ppmv.

A third test was carried out in a manner similar to the first test decribed above but using a non-vitiated air supply, i.e., indirectly preheated air with no combustion products. At a firing temperature of about 2060° F., the conventional combustor emitted about 260 ppmv of $NO_x$ while the combustor of the present invention operating in a homogeneous mode emitted about 65 ppmv. The fuel use in each of the above tests was No. 2 distillate.

From the foregoing laboratory test data and in particular that of the third test utilizing a non-vitiated air supply, those skilled in the art can appreciate the significant reduction (a factor of four) in $NO_x$ emissions achieved by the combustor contructed in accordance with the present invention. By utilizing such combustors, $NO_x$ emission levels will be substantially reduced and will meet most $NO_x$ emission requirements.

Having thus described two embodiments of the present invention and their modes of operation, those skilled in the art can better understand how the invention is distinguishable from the aforementioned prior art patents. Specifically, U.S. Pat. No. 3,946,533 to Roberts et al appear to discribe a combustor with two stages and multiple fuel nozzles for emission control. However, the fuel and air are mixed outside the combustion liner wall which is distinguishable from the invention described here. Also, in accordance with the combustor of the present invention, there are some conditions where the reaction occurs in an unpremixed heterogeneous mode (i.e., during startup, part load and transient periods of base load), a mode of operation not possible in the combustor of the Roberts et al patent. The modes of operation of the present invention facilitate a large turndown ratio, easy ignition and crossfiring, and flame stability, essential characteristics of a practical design. Also, switching from the heterogeneous to the homogeneous mode of operation is achieved in accordance with the present invention by varying the fuel split between the first and second stage fuel nozzles, a characteristic not disclosed by Roberts et al.

U.S. Pat. Nos. 3,958,413 to Cornelius et al and 3,958,416 to Hammond, Jr. et al relate to two-stage combustors with the stages separated by a converging-diverging throat section. Also, the first stage of both of these patents is used at some times during the cycle as a section where combustion occurs and at other times in the cycle where premixing occurs. Therefore, flashback does not cause a hardware catastrophe, as would be the situation in the Roberts et al patent. The Cornelius et al and Hammond, Jr. et al patents also appear to describe a variable air inlt geometry for changing the air scheduling between stages to accomplish the transition from heterogeneous combustion in the first stage or in the first and second stages to homogeneous combustion in the second stage only. In contradistinction, the present invention utilizes fuel scheduling between stages, utilizing multiple fuel nozzles (rather than variable geometry) and varying the fuel split rather than the air split.

In summary, a duel-stage dual-mode combustor is described which will operate reliably over the entire gas turbine cycle at flame temperatures which will substantially reduce $NO_x$ emission levels.

Various changes and modifications can be made in the combustor and process of this invention without departing from the spirit and scope thereof. The various embodiments which have been described herein were set forth in order to illustrate the invention but were not intended to limit it.

We claim:

1. A method of operating gas turbine combustor to produce low $NO_x$ emission, said combustor having first and second combustion chambers interconnected by a throat chamber, said first chamber having first fuel introduction means and at least one of said throat chamber and said second chamber having second fuel introduction means, comprising in sequence,
   (a) continuously introducing fuel into said first chamber through said first fuel introduction means and causing said fuel to burn therein;
   (b) commencing the introduction of fuel to said second chamber through said second fuel introduction means and increasing the rate of introduction thereof until the rate of fuel introduction through all of said fuel introduction means is about the desired fuel introduction rate, ignition of the fuel in said second chamber being commenced as a result of passage of combustion products from said first chamber to aid second chamber;

(c) decreasing the rate of fuel introduction through said first fuel introduction means and correspondingly increasing the rate of introduction through said second fuel introduction means such that the overall rate of introduction remains substantially constant until at least the burning of fuel in said first chamber ceases; and (d) increasing the rate of fuel introduction through said first fuel introduction means and correspondingly decreasing the rate of introduction through said second fuel introduction means such that the overall rate of introduction remains substantially constant until the desired level of $NO_x$ emission from the combustor is realized.

2. The method of claim 1 wherein the fuel introduction through said first fuel introduction means in step (c) is decreased until all fuel introduction is through said second fuel introduction means.

3. The method of claim 2 wherein the fuel distribution at the end of step (d) is such that the majority of fuel is introduced through said first fuel introduction means.

4. The method of claim 3 wherein said fuel distribution at the end of step (d) is such that at least 60% of the total fuel is introduced through said first fuel introduction means.

5. The method of claim 1 wherein the fuel distribution at the end of step (d) is such that the majority of fuel is introduced through said first fuel introduction means.

6. The method of claim 1 wherein said first fuel introduction means is an axisymmetric fuel nozzle and said second fuel introduction means comprises a plurality of fuel nozzles symmetrically disposed.

* * * * *